Feb. 12, 1946. H. R. HOLLOWAY 2,394,778
SEED PLANTER
Filed Jan. 31, 1944
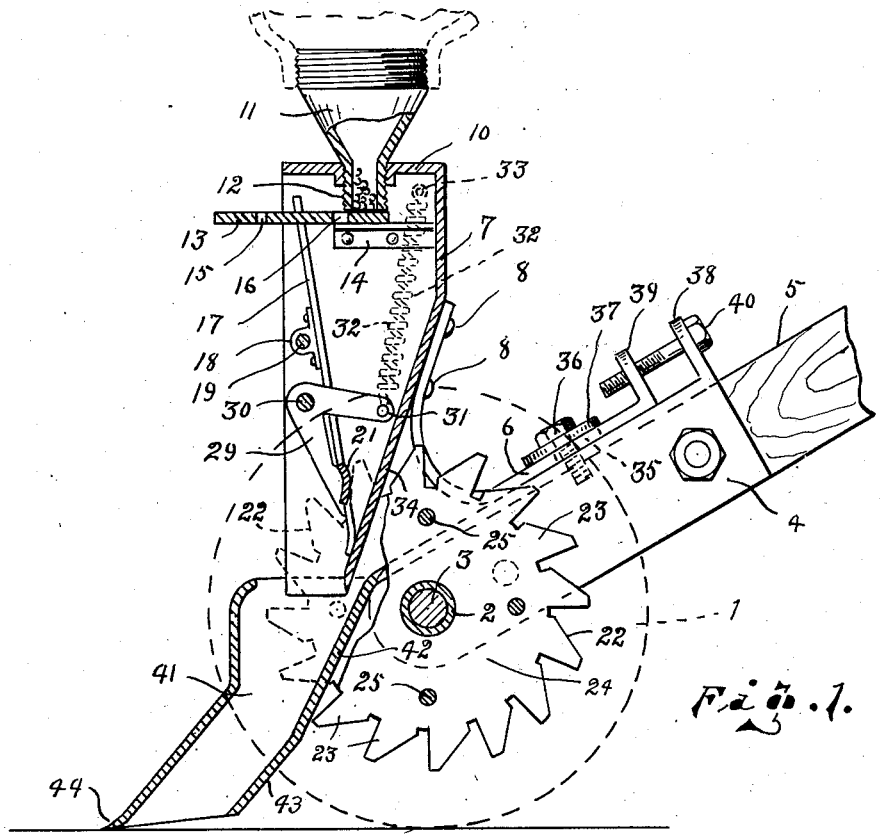
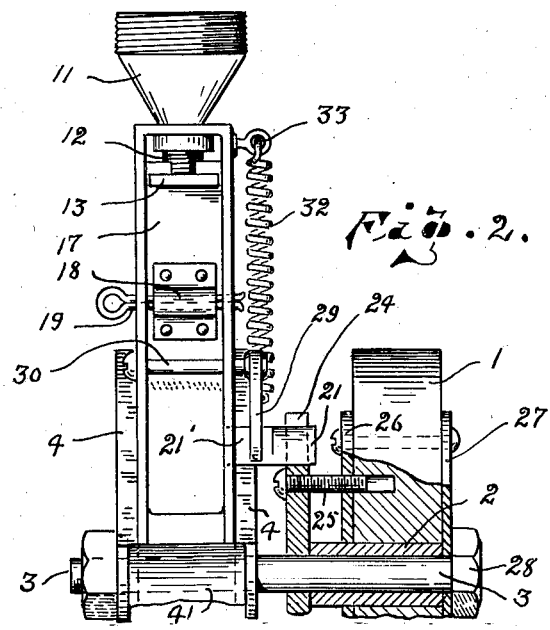
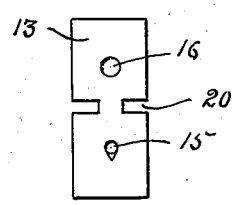
INVENTOR.
H. R. Holloway
BY Geo. Stevens.
Atty.

Patented Feb. 12, 1946

2,394,778

UNITED STATES PATENT OFFICE 2,394,778

SEED PLANTER

Hamilton R. Holloway, Duluth, Minn., assignor of one-half to John A. Bjorback, Duluth, Minn.

Application January 31, 1944, Serial No. 520,511

1 Claim. (Cl. 111—82)

This invention relates to a seed planter and has special reference to one particularly adapted for use by a single operator and in comparatively small gardens or areas to be planted. One of the principal objects of the invention is simplicity, another is that of as few parts as possible and convenient adjustment of same.

Referring now to the accompanying drawing forming part of this application and in which like reference characters indicate like parts.

Fig. 1 is a part sectional and part elevational view of one of my improved planters showing the seed controlling mechanism and handle attachment, with the bull wheel for driving said mechanism removed.

Fig. 2 is a front elevation of the seed controlling mechanism showing the upper portion of the bull wheel in elevation and other parts thereof in section, and:

Fig. 3 is a plan view of the reciprocal seed feeding slide.

The simpler form of the seeder is provided with but one main driving wheel referred to above as the bull wheel and indicated at 1, which is provided with a sleeve bushing 2 fixed therein and rotatably carried upon the shaft 3, for operating the intermittent seed feeding device, which will be described later. Upon the opposite end of this shaft is mounted the handle and conveyor mechanism ferrule 4, the handle being illustrated at 5, which is preferably of wood and fixed therein, while the ferrule obviously should be of metal. On the top of the ferrule 4 is adjustably mounted the somewhat arcuately shaped bracket 6 which at its uppermost end is attached as at 8, 8, to the vertically disposed tubular seed conveyor 7. In this instance the tube 7 is preferably of rectangular form and open upon its front face and greater in length from back forwardly than transversely and is provided with the closed uppermost end 10 having means for adjustable reception of the lower conically shaped end 11 of the seed supply container which may be of any desired shape, though obviously for small seeds need not be of great capacity. Directly below the lower end of the discharge spout 12 of the seed container and within the seed conveyor tube 7, is installed the removable and adjustable slide 13 and which preferably maintains a slidable fit transverse the end of the feeding spout, and for which purpose each of the side walls of said tube are installed short angle bars 14 providing supports for the slide 13. This slide is preferably formed with two sizes of thru holes, a smaller one indicated at 15 and a larger one indicated at 16, to accommodate to some extent at least, the different size seeds being planted.

As operating means for this slide the flat rocker arm 17 is pivoted as at 18 upon a removable pin or pintle 19 installed through the opposite sides of the seed conveyor tube and the upper end of which is preferably bifurcated and straddles the reduced narrow portion 20 of the slide 13, so that the latter may be readily removed and replaced or changed end for end as desired after the pintle 19 has been removed to free the rocker arm 17 for such adjustment.

The lower end of the rocker arm is provided with a lateral projection 21 towards the bull wheel 1 for progressive engagement with the inclined face 22 of each tooth 23 of the operating disc 24 which is mounted preferably on four elongated screws 25 these being screw threadedly installed through the plate 26 for securely holding of the disc 24 at all times tightly against the end of the bushing 2 when the machine is fully assembled with the opposite end of the bushing 2 impinging against a face plate 27, installed intermediate of the head 28 of the shaft or bolt 3, and the outer face of the bull wheel 1. As a means for permanently biasing the lowermost end of the rocker arm 17 toward its closed position as illustrated in Fig. 1, I have provided a sort of bell crank shaped lever 29 mounted upon the extreme innermost end of the through shaft 30 below the pintle 18 through the opposed side walls of the tubular seed conveyor 7, and to the shorter arm of which lever is attached as at 31, the contractile helical spring 32 attached at its opposite end to the side or back wall of the seed conveyor 7 as at 33. The lowermost extension of the crank arm 29 is flattened upon one edge and shaped to engage at all times the innermost flat front surface 21' of the extension 21, thus providing means for keeping the lower end of the rocker arm 17 closely engaging the inner face of the inclined back wall 34 of the seed conveyor and at which time apparently the feeding slide 13 is in its outermost position, thus preventing any seeds passing through same, however, as the seeder is pushed forward and the disc 24 rotates, the teeth 23 of said disc will progressively engage the extension 21 of the rocker arm and rock same accordingly, which will operate the slide 13 while the contractile spring 32 through the bell crank lever 29 will operate it in the opposite direction, which at each stroke will obviously feed one or more seeds through the opening in said slide, depending upon its adjustment and relative engagement with the inclined face of the teeth of the disc 24.

Now as an ideal means for adjustment of the stroke of the rocker arm 17 I have resorted to a convenient change in the relative engagement of the inclined face of the teeth 23 by having in the straight and flat terminus of the bracket 6 which engages the flat free surface of the ferrule 4, provided with a through slot indicated at 35 and also with the screw threaded bolt 36 passing through said slot 35 and provided with a suitable washer 37 for holding same in any desired adjusted position while the upper end of the ferrule 4 has an upstanding lug 38 to correspond with a similar lug 39 upon the upper edge of the flat portion of the bracket 6 for the reception of the screw bolt 40 which is rotatably mounted in the lug 38 and screw threadedly mounted in the companion lug 39 so that any desired back and forth adjustment of the seed feeding tube may be accomplished and thus vary the duration of time of engagement of the projection 21, with the inclined face of each tooth, thus regulating the extent of motion of the seed feeding slide 13. It is to be noted that the distance below the slide 13 in the tube from the lowermost end thereof which engages the inner face of the inclined wall 34 of the tube, is ample to provide for the falling of the seed so as to retard its ultimate sowing before a second admission of seeds into the tube by the action of the slide 13 may occur.

For convenience in forming and cheap construction I have shown the auxiliary feeding tubular portion 41 of the device as being a continuation of the upper wall of the ferrule 4 and preferably shaped substantially as shown at 42 and 43, the lower plowing terminal of which as at 44 may be any desired shape and obviously the extension of the plowing end of the auxiliary tube must be governed by the operator and depending upon what angle he holds the handle of the device.

It is to be noted that simply for convenience in illustrating upon the restricted space at hand the bull wheel 1 is very much smaller in proportion to the balance of the mechanism than would be ordinarily employed and that the plowing end of the auxiliary feeder tube protrudes beyond same, which would be necessary in actual practice.

Having thus described one embodiment of my invention, what I claim and wish to secure by Letters Patent is:

A seed feeding tube for upright disposition within a seed sowing wheeled vehicle having a seed supply hopper communicating with said tube, comprising a reciprocal discharge slide at the bottom of said hopper having therein a plurality of different sized holes for selective passage of seeds therethrough from said hopper into said tube, a lever pivotally mounted within said tube below said slide and engageable with said slide for operating same, a rotatable toothed disc carried by said vehicle intermediate of said tube and the wheels of said vehicle and rotated thereby for intermittent operation of the opposite end of said lever, and an adjustable holding clamp carried by said vehicle and supporting said tube in such a manner that the adjustment thereof toward or from said disc will control the duration of engagement of the lower end of said lever with each tooth of said disc thus augmenting the selectivity of the seed feeding operation.

HAMILTON R. HOLLOWAY.